April 14, 1970 S. R. HOFSTEIN 3,505,804

SOLID STATE CLOCK

Filed April 23, 1968

INVENTOR
Steven R. Hofstein

BY Samuel Cohen

ATTORNEY

United States Patent Office 3,505,804

Patented Apr. 14, 1970

3,505,804

SOLID STATE CLOCK

Steven R. Hofstein, Princeton, N.J., assignor to RCA Corporation, a corporation of Delaware Filed Apr. 23, 1968, Ser. No. 723,512

Int. Cl. G04c 3/300

U.S. Cl. 58—23 7 Claims

ABSTRACT OF THE DISCLOSURE

The face plate of a solid state clock employs a liquid crystal of relatively limited life—not greatly different than that of the clock battery. The latter is integrated into the face plate structure so that both the face plate and battery are replaced at the same time.

BACKGROUND OF THE INVENTION

Many proposals have been made for solid state clocks, such as wrist-watches, which require no moving parts. At the present state of battery technology, for an arrangement of this type to be useful as a wrist-watch, the total drain on the power supply must not exceed the tens of microwatts range. The circuit portion of the watch which includes the oscillator, counter and decoder, can be made as an integrated circuit which operates well within this region. However, up to now, there have been difficulties in providing an appropriate display which does not use much power.

It has now been discovered that a relatively new class of substances useful for display purposes, known as nematic liquid crystals, do operate within these power requirements. Such crystals are described, for example, in copending application, Turn-Off Method and Circuit for Liquid Crystal Display Element, Ser. No. 667,858, filed Sept. 14, 1967 by George H. Heilmeier and assigned to the same assignee as the present application. As explained there, a liquid crystal, when in an unexcited state, is relatively transparent to light and when in an excited state, scatters light. The liquid crystal may be placed in its excited state by applying an electric field across the crystal.

The difficulty with liquid crystals at the present state of their development is that they are of relatively limited life. It is expected that lifetimes significantly in excess of a year—the approximate life of the battery of the wrist-watch, will not be achievable in the near future.

The object of the present invention is to provide a practical solid state clock which can use a display material of relatively limited life such as a liquid crystal.

SUMMARY OF THE INVENTION

A solid state clock according to the invention employs a limited life substance such as liquid crystal for display purposes. The battery for the clock is built into the same face plate structure as the limited life substance so that when, for example, the battery of the clock is replaced, the face plate is replaced with it.

DETAILED DESCRIPTION

Figures 1, 2, 3, 4, 5:
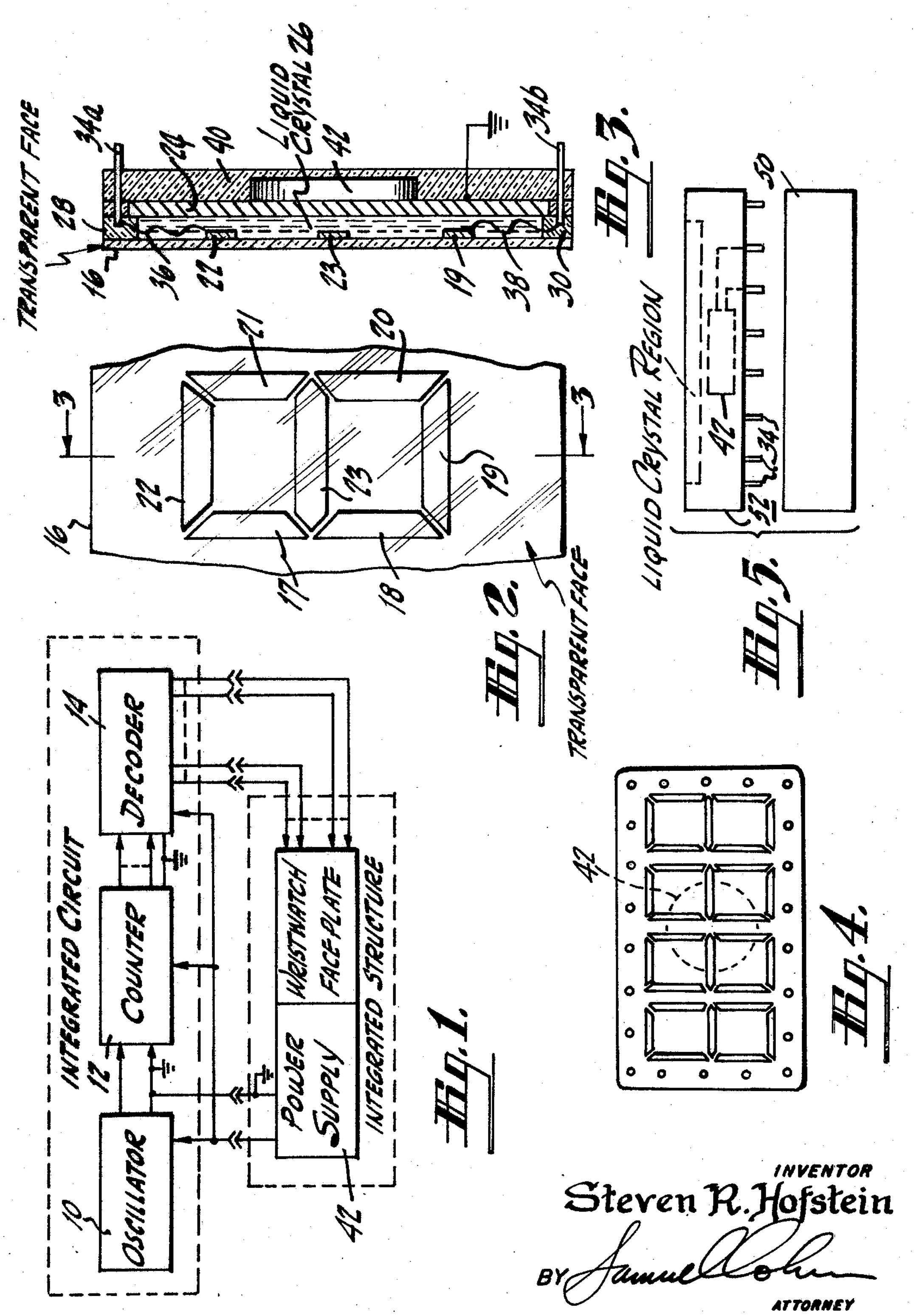
FIGURE 1 is a block circuit diagram of a wrist-watch according to the invention.
FIGURE 2 is a plan view of a portion of the face plate of the watch.
FIGURE 3 is a section taken along line 3—3 of FIGURE 2.
FIGURE 4 is a plan view at the entire face plate of the wrist-watch.
FIGURE 5 is a side view of the wrist-watch of the invention with the face plate separated from the body of the wrist-watch.

The solid state clock of FIG. 1 includes an oscillator 10, which is preferably crystal-controlled, a counter 12 and a decoder 14. These three circuits are integrated onto a single chip.

The operation of the integrated circuit 10, 12, 14 is well understood in the art. The oscillator continuously generates oscillations at a fixed frequency. These oscillations drive the counter 12 and the latter produces successive counts. These are decoded by the decoder 14 which produces different combinations of outputs. Each such output can be considered to represent a binary digit.

The outputs of the decoder 14 are applied to the display elements of the clock. For purposes of the present application, these are shown to consist of four, 7-segment display elements (see FIG. 4), two display elements for hours and two for minutes. One of these elements is shown in detail in FIGS. 2 and 3. This element includes a transparent face 16 formed of insulating material and having seven transparent conductive segments 17–23 secured to the underside thereof. Located between the transparent face and the opaque, conducting back plate 24 is the liquid crystal 26. As an alternative, the back plate may consist of segments which align with the segments on the face and which are secured to the insulator 40. The insulating gaskets 28 and 30 of FIG. 3 serve to seal the face plate structure and to space the back plate from the transparent face.

Each of the conducting segments 17–23 is connected to a different pin. Two such pins, 34*a* and 34*b*, are shown in FIG. 3. For purposes of illustration, short flexible leads 36 and 38 are shown connecting segments 22 and 19 to these two pins 34*a* and 34*b*. In practice, the connections instead may be made by means of very fine transparent conductors on the underside of the transparent face.

An insulation element 40 is located behind the back plate 24. A battery 42 is located within this insulator. One terminal of the battery may connect to the back plate 24 which, in turn, may provide the ground for the wrist-watch. This back plate may be connected via one of the terminals to integrated circuit 10, 12, 14. The other terminal of the battery 42 may be connected to another terminal which leads to the integrated circuit. The battery provides the necessary power to operate the circuit.

In the operation of the solid state clock of the invention, in response to a particular decoder output, a voltage is applied to one or more of the conducting segments of one or more of the display elements. In response to a voltage applied to a conducting segment, the liquid crystal adjacent to that segment and located between it and the back plate becomes excited and appears to the viewer to light up. Thus, for example, if a voltage is applied to segments 19, 20, 21, 22 and 23, the number 3 appears to be illuminated. The areas of the face over which the fine wires 36, 38 pass may be masked to eliminate any faint illumination produced at the wires. Or, if the back plate consists of segments corresponding to those on the face then no illumination will be created at the leads.

While the liquid crystal 26 provides a very suitable display substance of good optical properties which requires practically no power and which is relatively inexpensive, it does have a serious disadvantage. The life of the liquid crystal is relatively limited—very much less than that normally contemplated for a wrist-watch, for example.

The above problem is solved according to the invention by integrating the battery 42 into the wrist-watch face plate structure as shown in FIGS. 3, 4 and 5. The integrated circuit comprising oscillator 10, counter 12 and decoder 14 is located in the case (either plastic or metal) which forms the bottom portion 50 of the solid state clock. The remainder of the clock includes the face plate with the four alphanumeric characters as shown in FIG. 4 and with the battery 42 integrated into the same structure as the face plate.

Inter connection between the face plate structure 52 and the integrated circuit structure 50 is by means of pins 34 which are located around the periphery of the face plate structure. (Two of the pins 34 are legended 34*a* and 34*b* in FIG. 3.) These pins on the one hand, connect to the various transparent sections of the alphanumeric characters and the battery 42 and on the other hand, connect to the integrated circuits when the structures 50 and 52 are interconnected. The points of connection of the two circuits are also shown schematically in FIG. 1.

There are two additional advantages which are achieved by constructing the solid state clock in accordance with the present invention. One is that the style of the face plate may be up-dated periodically as, for example, once a year when the battery wears out. It is practical to do this as the material of which the face plate is made is intrinsically relatively inexpensive. The second advantage is that the user need not keep track of when it is necessary for him to change the battery of the clock. After an interval of time, roughly corresponding to the life of the battery, the display itself will fail and when the display fails to light up, the user knows that it is time to change the battery. Further, when the liquid crystal comes to the end of its life, its color actually changes. To enhance this feature of the invention, the liquid crystal lifetime may be made slightly shorter than the normal battery lifetime.

What is claimed is:

1. In a clock which includes a battery operated circuit for producing outputs suitable for energizing a solid state display, the improvement comprising:

a removable structure comprising a solid state faceplate for displaying time which includes electronic display means driven by said cirsuit; and said battery integrated into said same structure as the faceplate so that both the battery and faceplate must be changed at the same time.

2. In a solid state clock as set forth in claim 1, said face plate including as its display means a liquid crystal.

3. A solid state clock comprising:

an electrically operated integrated circuit for producing outputs suitable for driving a solid state display;

a solid state display structure for displaying time including a transparent face, sections of transparent conductors secured to one surface of said face, a back plate conductor spaced from and facing said surface, and a liquid crystal located between said back plate conductor and said face; and connections from said conductive sections to said ingrated circuit for conducting the outputs of said integrated circuit to said display.

4. A solid state clock as set forth in claim 3, wherein said solid state display structure is removable and further including a battery integrated into said solid state display structure, whereby the display and battery must be removed at the same time.

5. In a wrist-watch operated by a battery and including a solid state face plate having battery operated, electronic display elements, an improved arrangement for indicating when the battery should be changed comprising, said display elements being formed of a material a physically observable characteristic of which changes somewhat prior to the time at which the useful life of the battery ends.

6. In a wrist-watch as set forth in claim 5, said material comprising a nematic liquid crystal.

7. A solid state clock comprising:

an electrically operated circuit for producing voltages suitable for driving a solid state display;

a solid state display for displaying time which includes a liquid crystal layer for scattering light in response to voltages applied thereto and a plurality of spaced, conductive segments adjacent to said layer, to which voltages may be applied for causing said liquid crystal to scatter light at the regions thereof adjacent to the segments receiving said voltages; and connections from said circuit to said conductive segments of said display for conducting the voltages produced by said circuit to said segments.

References Cited

UNITED STATES PATENTS 3,427,797 2/1969 Kimura et al. ---------- 58—23

FOREIGN PATENTS 1,401,846 4/1965 France.

STEPHEN J. TOMSKY, Primary Examiner

E. C. SIMMONS, Assistant Examiner

U.S. Cl. X.R.

58—50; 340—127, 267